United States Patent

Wade et al.

[11] Patent Number: 6,131,341
[45] Date of Patent: Oct. 17, 2000

[54] SEALING SYSTEM FOR VEHICLE DOOR

[75] Inventors: David Arthur Wade, Dearborn Heights; Bruce D. Burnside, Monroe; John Matthew Ginder, Plymouth; Larry Dean Elie, Yspilanti, all of Mich.

[73] Assignee: Ford Global Technologies, Inc., Dearborn, Mich.

[21] Appl. No.: 09/236,465

[22] Filed: Jan. 25, 1999

[51] Int. Cl.[7] .................................................. E06B 7/16
[52] U.S. Cl. ........................................ 49/478.1; 49/475.1
[58] Field of Search .............................. 49/478.1, 475.1; 296/146.9

[56] References Cited

U.S. PATENT DOCUMENTS

| | | |
|---|---|---|
| 2,959,832 | 11/1960 | Baermann . |
| 3,862,515 | 1/1975 | Baermann . |
| 5,129,184 | 7/1992 | Fish ........................................ 49/478.1 |
| 5,309,680 | 5/1994 | Kiel ......................................... 49/478.1 |
| 5,575,485 | 11/1996 | Merla et al. ............................ 49/478.1 |
| 5,606,828 | 3/1997 | Hall et al. ............................... 49/478.1 |

*Primary Examiner*—Daniel P. Stodola
*Assistant Examiner*—Hugh B. Thompson
*Attorney, Agent, or Firm*—Joseph W. Malleck

[57] ABSTRACT

A vehicle door sealing system includes a flexible weatherstrip containing magnetizable particulate material. Selected areas of the weatherstrip are magnetized to enhance the sealing action at hard-to-seal zones, such as curved corner areas along the door perimeter. The magnetic action is confined to the hard-to-seal areas so that the magnetic action will not make it excessively difficult for a person to open the vehicle door.

1 Claim, 4 Drawing Sheets

SEALING SYSTEM FOR VEHICLE DOOR

BACKGROUND AND SUMMARY OF THE INVENTION

This invention relates to sealing systems for vehicle doors, and particularly to sealing systems having sealing elements that are magnetized at selected points along the sealing element length. The partially magnetized sealing element can be located on a vehicle door or body.

Under conventional practice, automotive vehicle doors are sealed with elastomeric materials, usually EPDM rubber, that are compressed between the door and body when the door is in the closed position. A latch and striker hold the door closed and maintain seal compression.

The sealing action achieved with the conventional sealing elements is adversely affected by such factors as manufacturing tolerances, and sealing surface imperfections at localized areas along the door perimeter. A typical sealing system may seal in an acceptable manner at some points along the door perimeter, while failing to seal properly at other points.

The present relates to a vehicle door sealing system, wherein the sealing action at selected points along the door perimeter is enhanced by locally magnetizing selected areas of the sealing elements. The magnetized areas of the sealing elements provide enhanced sealing action at hard-to-seal areas, without unduly increasing the overall seal force between the mating seal surfaces. The invention improves the sealing contact force around the perimeter of the door, without unduly increasing the manual force required to open the door.

DESCRIPTION OF A PREFERRED EMBODIMENT OF THE INVENTION

Figure 1:
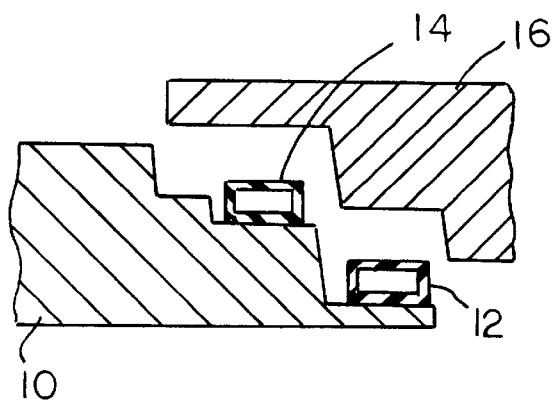
FIG. 1 is a fragmentary sectional view taken through a vehicle door sealing system of the present invention, taken with the door in an open position.
Figure 2:
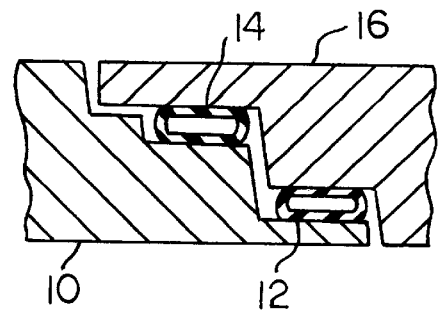
FIG. 2 is a fragmentary sectional view taken in the same direction as FIG. 1, but with the door in a closed position.

FIGS. 1 and 2 are sectional views taken through a vehicle door sealing system, with the door in an open position (FIG. 1), and in a fully-closed position (FIG. 2). A vehicle door 10 has an elongated flexible weatherstrip 12 and 14 that are magnetized to increase the contact force between the door 10 and the body 16.

Weatherstrip 12 or 14 comprises an elastomeric tubular cross-section member having a longitudinal axis. The tubular members have sufficient length to extend along, and around, the entire periphery of the door 10, so as to form continuous peripheral seals around the door. The tubular seals 12 and 14 will normally include relatively straight sections along the straight edges of the door, and curved sections around the corners of the door.

The elastomeric tubular members that form weatherstrip 12 or 14 have therein finely divided particulate material formed of a permanently magnetizable substance. Permanently magnetizable particulates that may be used include so-called ceramic or ferrite materials that contain iron, oxygen and one or more metals such as barium, strontium, manganese, and zinc (e.g. $Fe_3O_4$ or $BaFe_2O_3$). Other preferred permanently magnetizable particulates include rare-earth magnets such as neodymium-iron-boron materials ($Nd_2Fe_{14}B$ with other elements sometimes added) and samarium cobalt ($SmCo_5$ and $SmCo_{17}$). Another class of permanently magnetizable materials are the alnicos, which contain aluminum, nickel and cobalt. Yet more materials that can be permanently magnetized, and that thus may be used, include other alloys and compounds containing iron, cobalt, nickel and other materials.

Preferably the particulate substance is a hard magnetization material having a relatively high magnetic coercive force when in the magnetized state. The concentration of the magnetizable particles in the elastomer is selected to be sufficient to achieve a significant magnetic force without unduly decreasing the flexibility of the elastomer. In preferred practice of the invention the concentration of the magnetizable material is approximately thirty percent of the total volume of the tubular wall. For example, the elastomeric material can occupy seventy percent of the tubular wall volume, while the permanently magnetizable material occupies thirty percent of the tubular wall volume. Within the broader scope of the invention, it is believed that the particulate material percentage can be in the range of ten percent to sixty percent. Weatherstrip 12 and 14 can be extrusions having constant cross sections along their length. Only selected sections of each weatherstrip are permanently magnetized.

In the system of FIGS. 1 and 2, the vehicle steel body 16 forms a magnetic connector path for the magnetic field generated within weatherstrip 12 and 14.

Figure 3:
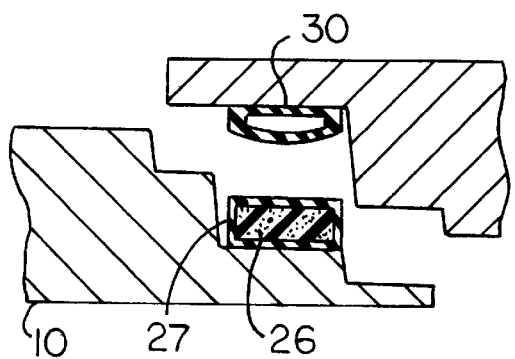
FIG. 3 is a fragmentary sectional view taken through another vehicle door sealing system of the invention, taken with the door in an open position.
Figure 4:
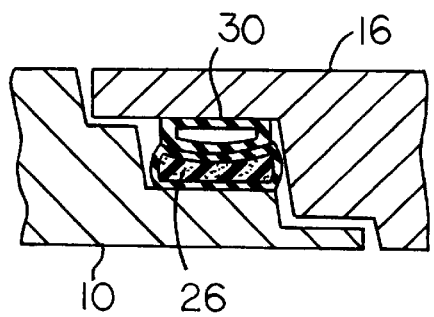
FIG. 4 is a fragmentary sectional view taken in the same direction as FIG. 3, but with the door in a closed position.

Referring to FIGS. 3 and 4, there is shown two cooperating molded elastomeric weatherstrip bodies 30 and 27 containing finely dispersed particulate material formed of a magnetically permeable substance and a magnetizable substance. The finely dispersed particulate material has sufficient concentration, so that when the exterior side surface of molded weatherstrip element 30 is in near proximity to weatherstrip element 27, a significant magnetic attractive force links the magnetized particles in element 27 to the magnetically permeable particles in element 30.

As shown in FIGS. 3 and 4, element 27 on the vehicle door contains a resilient elastomeric foam core 26. Foam core 26 contains finely dispersed particles of a magnetizable substance in such concentration that when the particles in core 26 are permanently magnetized (eg. by the apparatus shown in FIGS. 5 or 6), the magnetized areas of element 27 can have an enhanced sealing engagement with element 30.

The cores shown in FIGS. 3 and 4 are a resilient foam material in which permanently magnetizable particles are embedded. The core could also be a fully dense (but compliant) gel or elastomer instead of a foam.

The magnetically permeable body 30 preferably contains particles comprising soft iron, nickel, cobalt and/or alloys of these materials, with or without other elements. The particulate concentration will again likely be in the range of ten to sixty percent by volume. selected areas along their respective longitudinal axes. Preferably the magnetized areas are located in the areas where the sealing system failures (leaks) are most likely to occur. Typically, the areas of greatest potential leakage are the curved corner areas of the vehicle door. The sections of weatherstrip 12 and 14 extending along the straight edges of the door are less likely to fail; hence, those sections are left in a non-magnetized state. A similar theory is used in the weatherstrip system shown in FIGS. 3 and 4.

The basic concept of the invention is to magnetize selected areas of the elastomeric weatherstrip elements, whereby the overall sealing contact force is enhanced, without degrading or unduly increasing, the door opening effort.

Figure 5:
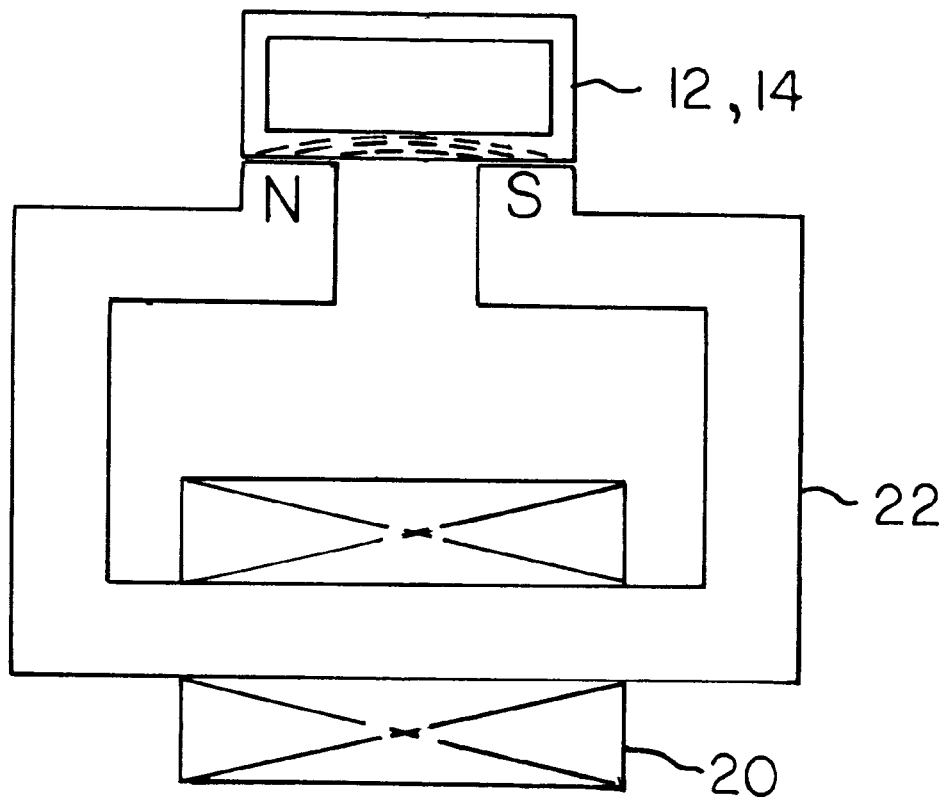
FIG. 5 is a schematic illustration of a magnetization mechanism used to magnetize selected areas of a sealing element used in the FIG. 1 sealing system.
Figure 6:
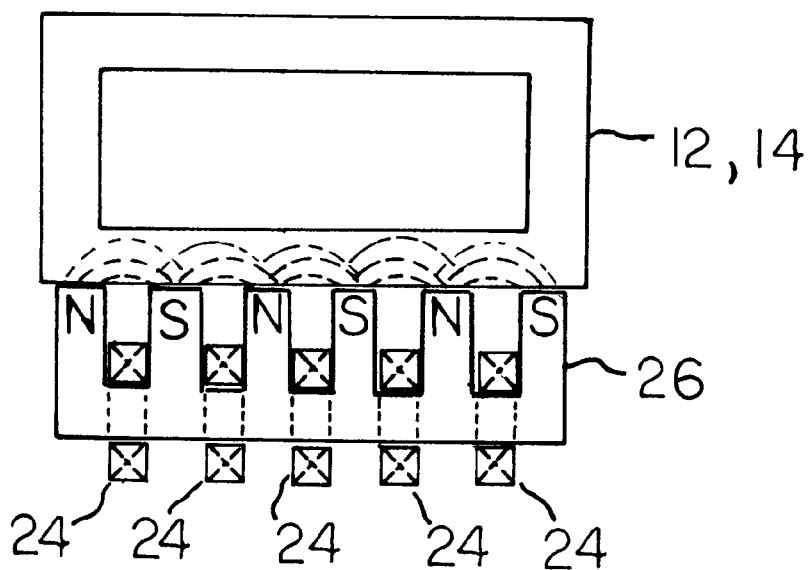
FIG. 6 is a schematic illustration of a second magnetization mechanism that can be used to magnetize selected areas of a sealing element used in the FIG. 1 sealing system.

Various known techniques can be used to locally magnetize the weatherstrips. FIG. 5 shows one mechanism that can be used. FIG. 6 shows another usable magnetization mechanism.

Referring to FIG. 5, there is shown a magnetization apparatus that includes a solenoid winding 20 and a magnetic frame 22 having a gap adapted to receive the weatherstrip, such that the magnetic flux passes through (along) the elastomeric tubular wall.

Referring to FIG. 6, there is shown a magnetization apparatus that includes plural solenoid windings 24 and a magnetic frame 26 having gaps adapted to receive only portions of the weatherstrip, such that magnetic flux moves across the gaps primarily along the surface of the weatherstrip. The electromagnets of FIGS. 5 and 6 could be replaced by permanent magnets in some versions of the magnetization apparatus. The weatherstrip can be magnetized during the molding (extrusion) operation (eg. at the end of the extruder line), or after the weatherstrip has been formed.

The magnetization mechanisms of FIGS. 5 and 6 could be used to magnetize the weatherstrips of FIGS. 3 and 4.

Figure 7:
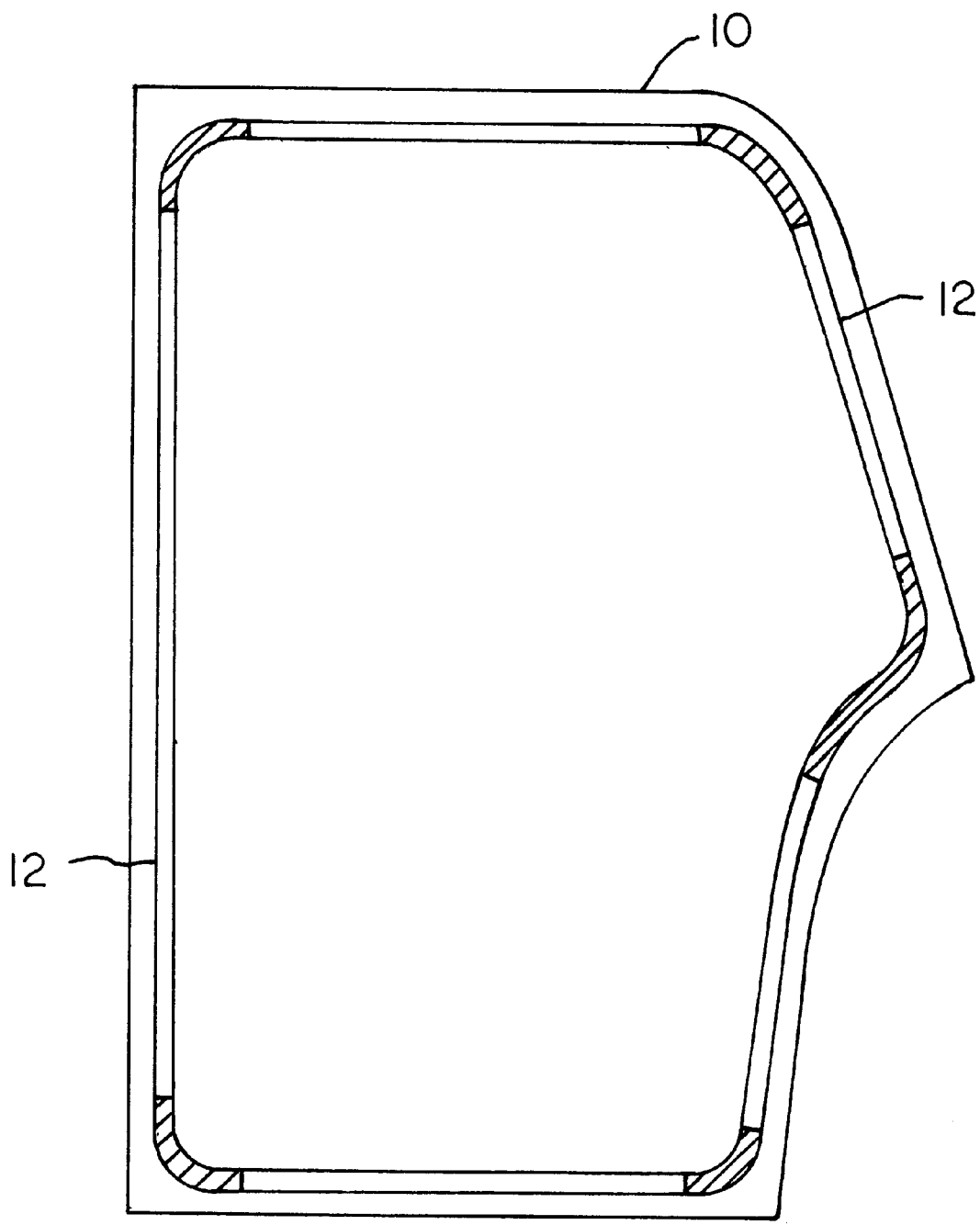
FIG. 7 is a side elevational view of a vehicle door equipped with a partially magnetized sealing element of the present invention.

FIG. 7 shows a representative door weatherstrip 12 affixed to a vehicle door 10; the magnetized areas of the weatherstrip are shown in section to differentiate such areas from the non-magnetized areas. Typically, the weatherstrip is magnetized at the curved (non-linear) sections.

The drawings show weatherstrip arrangements wherein a partially magnetized weatherstrip seals against a steel surface (FIG. 1), or a partially magnetized weatherstrip seals against a weatherstrip containing magnetically permeable materail (FIG. 2). It is also possible to provide a weatherstrip system wherein two partially magnetized weatherstrip elements seal against one another.

Figure 8:
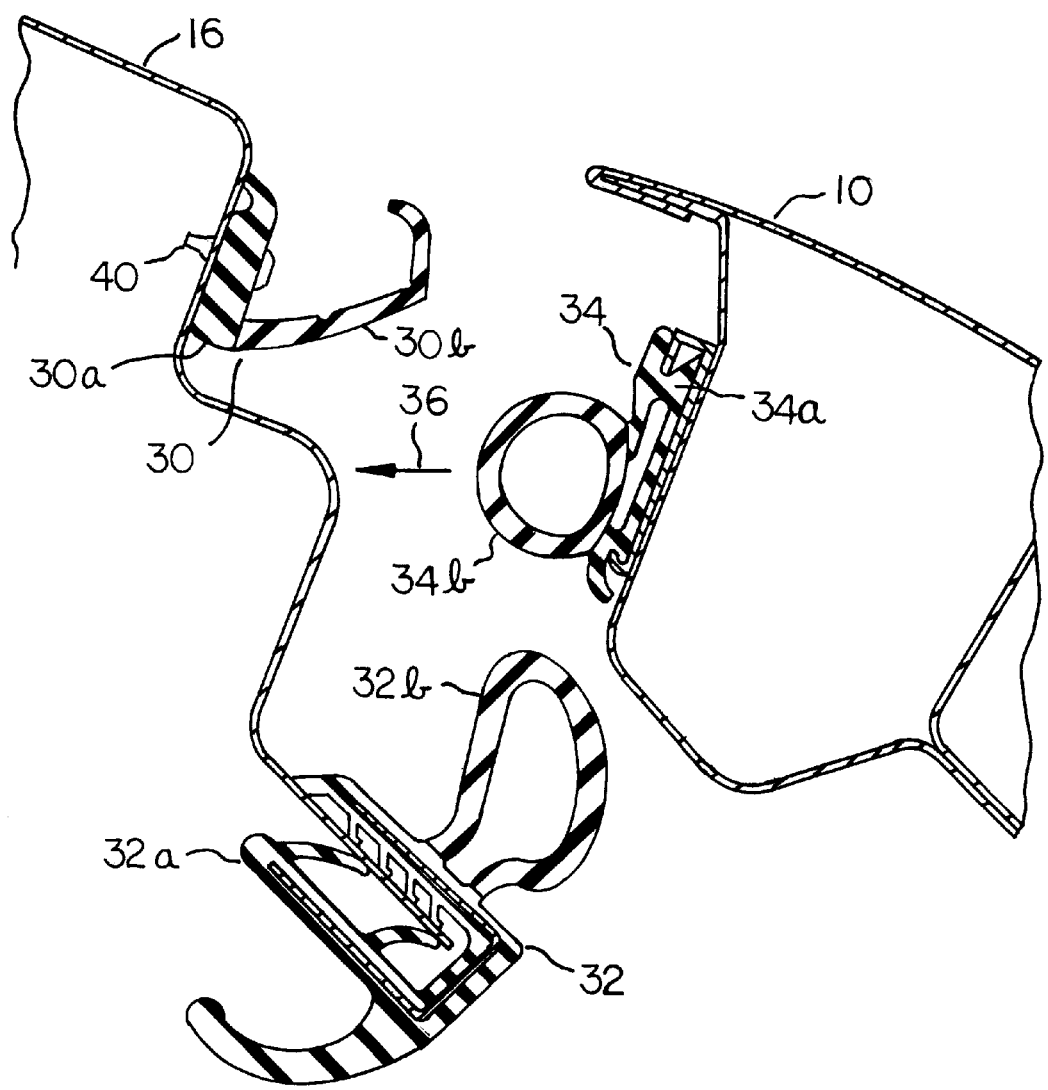
FIG. 8 is a fragmentary sectional view taken through a further door sealing system embodying the invention.

FIG. 8 shows a redundant vehicle door sealing system of the present invention, wherein weatherstrip 30 and 32 are mounted on the vehicle body 16, and weatherstrip 34 is mounted on the vehicle door 10. The door moves along a pathline 36 to reach the closed position. A feature of the weatherstrip 30, 32 and 34 is that each weatherstrip can be formed as a coextrusion, i.e. a weatherstrip formed by combining two separately-formed extrusions by simultaneously passing both extrusions through a die or set of rolls having the shape of the final product.

In the illustrated weatherstrip extrustions, the mounting section of each weatherstrip is formed by one extruder and the deflectable sealing section is formed by a second extruder. Each mounting section is designated as 30a, 32a, or 34a, whereas each respective sealing section is designated as 30b, 32b, or 34b.

The elastomer for each mounting section can be a different material than the elastomer for each sealing section. Also, the elastomer for each mounting section can be a pure elastomer (without the particulate filler). However, in some cases the employment of magnetized particles in the mounting section of the weatherstrip is advantageous in that the magnetic particles can exert a grip force between the mounting section and steel substrate.

For example, the mounting section 30a for weatherstrip 30 can have a filler of magnetized particles, whereby the weatherstrip can be mechanically attached to the vehicle body without adhesives. At spaced points along weatherstrip 30 rivet type fasteners 40 can be extended through mounting section 30a and the vehicle body wall to provide a mechanical attachment. Magnetized particles within mounting section 30a augument the attachment and preclude air leakage in the zones between the fasteners.

As in the previous examples, the sealing sections 30b, 32b and 34b are flexible elastomers having dispersed magnetizable particles therein. Selected areas along the sealing sections are magnetized to enhance the sealing action at hard-to-seal areas.

What is claimed:

1. A vehicle door having peripheral edges that form corners; and a flexible weatherstrip affixed to said door; said weatherstrip comprising an elastomeric sealing strip formed into a loop configuration that includes curved sections at the door corners and relatively straight sections extending between said curved sections; and particulate material dispersed throughout said elastomeric strip; said particulate material being formed of a permanently magnetizable material; said particulate material being magnetized only along the curved sections of the elastomeric strip, leaving the straight sections unmagnetized; whereby the magnetized particulate material augments the sealing action of the elastomeric strip only along the curved sections of said strip; said elastomeric sealing strip including a vacant hollow tubular wall that is deformable to effect a seal; said particulate material being dispersed within the hollow tubular wall.

* * * * *